(12) United States Patent
Kornbluth et al.

(10) Patent No.: US 12,374,482 B2
(45) Date of Patent: Jul. 29, 2025

(54) CARRIER CHUCK COMPRISING A PLURALITY OF MAGNETS AND METHODS OF FORMING AND USING THEREOF

(71) Applicant: Intel Corporation, Santa Clara, CA (US)

(72) Inventors: Yosef Kornbluth, Phoenix, AZ (US); Whitney Bryks, Tempe, AZ (US); Ravindranadh Eluri, Tempe, AZ (US); Aaditya Anand Candadai, Chandler, AZ (US); Srinivas Pietambaram, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 18/059,992

(22) Filed: Nov. 30, 2022

(65) Prior Publication Data

US 2024/0177907 A1    May 30, 2024

(51) Int. Cl.
*H01F 7/20* (2006.01)
*B32B 3/18* (2006.01)
*B32B 3/30* (2006.01)
*B32B 15/18* (2006.01)
*B32B 17/06* (2006.01)

(52) U.S. Cl.
CPC ............. *H01F 7/206* (2013.01); *B32B 3/18* (2013.01); *B32B 3/30* (2013.01); *B32B 15/18* (2013.01); *B32B 17/06* (2013.01); *B32B 2307/208* (2013.01)

(58) Field of Classification Search
CPC ......... H01F 7/206; H01F 7/0257; B32B 3/18; B32B 3/30; B32B 15/18; B32B 17/06; B32B 2307/208

USPC .......................................................... 335/289
See application file for complete search history.

(56) References Cited

U.S. PATENT DOCUMENTS

| | | | | |
|---|---|---|---|---|
| 1,970,922 | A * | 8/1934 | Simmons ............. | B23Q 3/1543 335/289 |
| 3,824,516 | A * | 7/1974 | Benowitz ................ | B03C 1/253 335/289 |
| 3,829,805 | A * | 8/1974 | Spodig .................... | F16F 15/03 335/289 |
| 5,270,678 | A * | 12/1993 | Gambut ............... | B23Q 3/1546 335/289 |
| 8,279,032 | B1 * | 10/2012 | Fullerton .............. | G06F 1/1616 335/289 |
| 8,912,872 | B2 * | 12/2014 | Sarh ...................... | B25B 31/005 335/289 |
| 2011/0057755 | A1 * | 3/2011 | Dams .................. | G03F 7/70758 335/289 |
| 2012/0242440 | A1 * | 9/2012 | Fullerton .............. | H01F 7/0242 335/306 |
| 2016/0284630 | A1 * | 9/2016 | Levander ............ | H01L 23/3135 |

(Continued)

*Primary Examiner* — Shawki S Ismail
*Assistant Examiner* — Lisa N Homza
(74) *Attorney, Agent, or Firm* — VIERING, JENTSCHURA & PARTNER MBB

(57) ABSTRACT

The present disclosure is directed to a carrier chuck having a base plate with a top surface, a plurality of first magnets positioned in a first region of the top surface, the plurality of first magnets configured to produce a first electromagnetic field to retain or suspend a panel placed on the carrier chuck during panel processing, wherein the first region corresponds to a region of the panel which comprises a magnetic material.

4 Claims, 5 Drawing Sheets

(56) References Cited

U.S. PATENT DOCUMENTS

| | | | |
|---|---|---|---|
| 2017/0110422 A1* | 4/2017 | Pietambaram | H05K 3/4007 |
| 2017/0287838 A1* | 10/2017 | Pietambaram | H01L 23/49838 |
| 2018/0019219 A1* | 1/2018 | Pietambaram | H01L 24/05 |
| 2019/0103348 A1* | 4/2019 | Manepalli | H01L 23/49866 |
| 2019/0206786 A1* | 7/2019 | Aleksov | H01L 21/4857 |
| 2019/0287915 A1* | 9/2019 | Unruh | H01L 21/76841 |
| 2021/0028101 A1* | 1/2021 | Nie | H01L 23/49838 |
| 2021/0050289 A1* | 2/2021 | Kong | H01L 23/49822 |
| 2021/0260718 A1* | 8/2021 | Raghavan | B24B 37/20 |
| 2022/0285079 A1* | 9/2022 | Pietambaram | H01F 17/0013 |

* cited by examiner

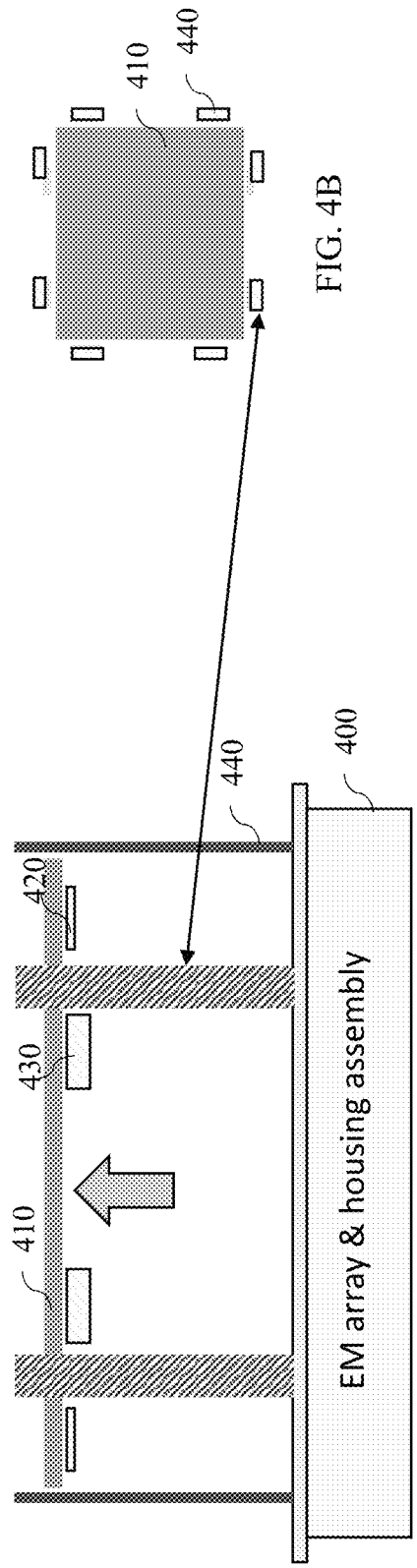
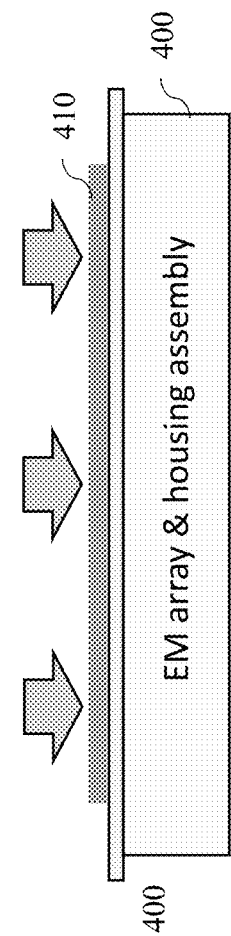
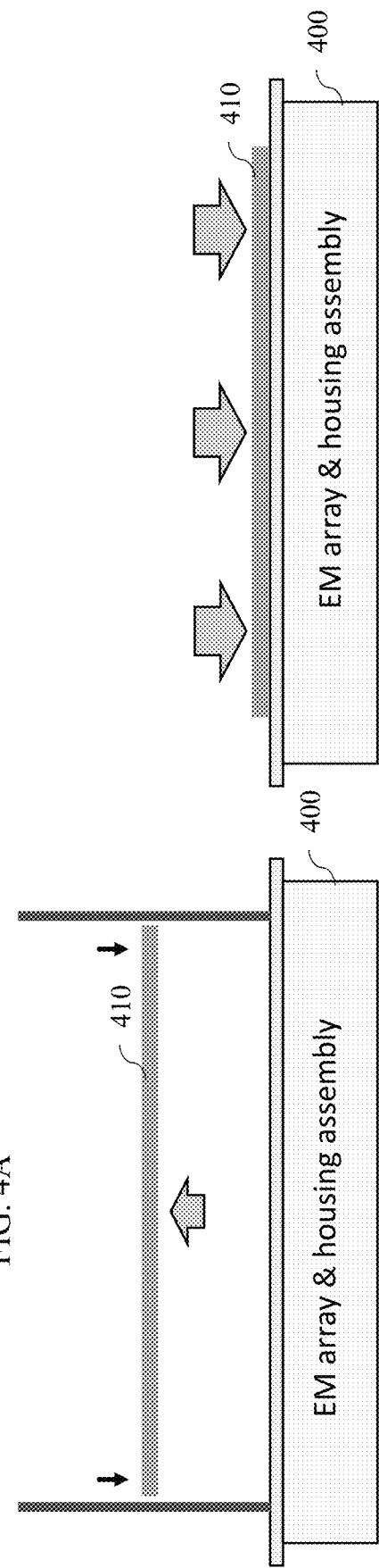
FIG. 4A
FIG. 4B
FIG. 4C
FIG. 4D

CARRIER CHUCK COMPRISING A PLURALITY OF MAGNETS AND METHODS OF FORMING AND USING THEREOF

BACKGROUND

In semiconductor panel fabrication, some panels, such as thin panels, may be supported by side bars and/or a center bar during panel processing to contact entire backside of panel. However, the use of side bars and/or a center bar to physically support the thin panels may result in panel breakage even through gentle mechanical handling. Further, even the panels are supported, the thin panels may still sag during panel processing due to residual stresses on the panel. Physical supports may also result in thin panels requiring large keep out zones (or KOZ regions) on the panel to ensure safe handling and transportation of the panels (e.g., without damaging the panels and/or damaging any electronic components on the panels) or to ensure certain processes are performed reliably Therefore, a carrier chuck may be needed to ease handling of such thin panels with during processing and transfer between processing tools.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the present disclosure. The dimensions of the various features or elements may be arbitrarily expanded or reduced for clarity. In the following description, various aspects of the present disclosure are described with reference to the following drawings, in which:

FIG. 4A to 4D shows an exemplary method according to an aspect of the present disclosure;

DETAILED DESCRIPTION

Figure 1:
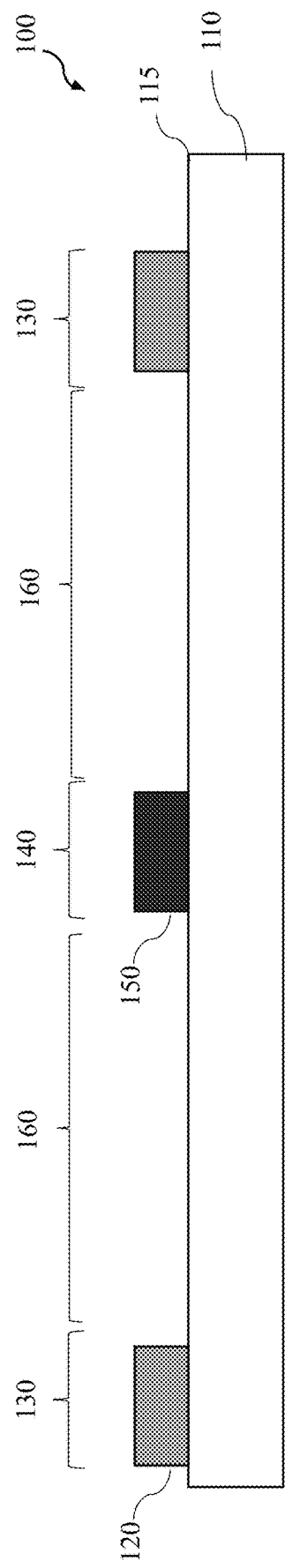
FIG. 1 shows a simplified cross-section view of an exemplary carrier chuck 100 according to an aspect of the present disclosure.

The following detailed description refers to the accompanying drawings that show, by way of illustration, specific details, and aspects in which the present disclosure may be practiced. These aspects are described in sufficient detail to enable those skilled in the art to practice the present disclosure. Various aspects are provided for devices, and various aspects are provided for methods. It will be understood that the basic properties of the devices also hold for the methods and vice versa. Other aspects may be utilized and structural, and logical changes may be made without departing from the scope of the present disclosure. The various aspects are not necessarily mutually exclusive, as some aspects can be combined with one or more other aspects to form new aspects.

Various aspects of the present disclosure provide a carrier chuck. The carrier chuck may be used for facilitating the handling of a panel for processing. The carrier chuck may include a base plate with a top surface. In an embodiment, a plurality of firsts magnet, whether permanent or electromagnetic, may be positioned in a first region of the top surface. The at least one first magnet may be configured to produce a first electromagnetic field to retain or suspend a panel placed on the carrier chuck during panel processing.

The first region may correspond to at least a region on the panel in which comprises a magnetic material. The magnetic material may be embedded or placed in the panel. This might be a part of keep out zones on the panel. A keep out zone may be a designated area or region of the panel where device features or other circuitry are not placed. For example, a keep out zone may be a dedicated area for panel handling.

In various aspects, the carrier chuck may be advantageously used as a carrier for handling a thin panel to reduce or prevent sag during panel processing through magnetic support, without the need for mechanical handling which may reduce or prevent panel breakage. In various aspects, magnetic material (e.g., magnets) may be embedded in keep out zones (i.e., wasted regions) of the panel. A magnetic field may be applied externally by the carrier chuck, so that the magnetic material is lifted upwards, minimizing the sag. The magnetic field can also be used to gently handle the panel evenly, without mechanical stress. Panels may remain flatter, even without the chuck contacting the panels directly. This may allow for easier panel handling, especially for thin panels.

The keep out zones (or KOZ regions) on the panel may be arranged to ensure safe handling and transportation of the panels (e.g., without damaging the panels and/or damaging any electronic components on the panels) or to ensure certain processes are performed reliably.

In various aspects, the magnets of the carrier chuck may be configured based on the keep out zones of the panels to be handled, which simplifies the chucking procedure. The magnets may be arranged or positioned in locations of the carrier chuck that matches with the keep out zones of the panel. By providing the magnets positioned in the first region corresponding to at least a part of the keep out zones on the panel, an electromagnetic force may be applied only to certain locations on the panel. In this regard, various aspects enable the electromagnetic force to be applied only on the keep out zones on the panel.

In an aspect, the panel may include magnetic material in at least a part of the keep out zones on the panel. The panel may include a first panel surface on which the one or more magnets may be disposed or attached. Alternatively, the magnetic material may be embedded in the panel itself. The first panel surface may be facing the top surface of the base plate when the panel and carrier chuck are electromagnetically bonded. In this regard, the panel and carrier chuck may be temporarily bonded until the electromagnetic force is absent.

In an aspect, the plurality of first magnets positioned in the first region of the carrier chuck may corresponds to a first zone on of the panel. The first zone may be a keep out zone of the panel. The first zone may be on a periphery of the panel. Magnetic material may be disposed or embedded in the first keep out zone of the panel.

In an aspect, the carrier chuck may include a plurality of second magnets. The plurality of second magnets may be positioned in a second region of the top surface of the chuck carrier. The plurality of second magnets may be configured to produce a second electromagnetic field to retain or suspend or reduce sag or stress of the panel placed on the carrier chuck during panel processing. The second region may correspond to a second zone of the panel. The second zone may be a keep out zone of the panel. The second zone may be on a center of the panel. Magnetic material may be further disposed or embedded in the second keep out zone of the panel.

In another aspect, the carrier chuck may include a bar. The bar may be positioned in the second region of the top surface of the carrier chuck. The bar may be configured to physically retain the panel placed on the carrier chuck during panel processing. The second region may correspond to the second keep out zone on a center of the panel.

In another aspect, the first electromagnetic field from the at least one first magnet positioned in the first region of the carrier chuck may be different from the second electromagnetic field from the at least one second magnet in the second region of the carrier chuck. The first electromagnetic field may be about 0.04 N and the second electromagnetic field may be about 0.7 N. In an aspect, the first electromagnetic field and the second electromagnetic field may be varied over time.

In another aspect, the first electromagnetic field may be configured to suspend the first zone of panel at a first height. The second electromagnetic field may be configured to suspend the second zone of the panel at a second height. The first height and the second height may be substantially the same height. In other words, the first and second magnetic field may be applied externally by the carrier chuck, so that the magnetic material is lifted upwards, minimizing the sag between the first height and the second height. The magnetic field can also be used to gently handle the panel evenly, without mechanical stress so that the panels may remain substantially flat (i.e., substantially same first and second height).

In another aspect, the first height and the second height may not be the same height.

In another aspect, the carrier chuck may include one or more vertical guides. The one or more vertical guides may be configured to prevent the panel from moving in a x-y direction during panel processing. The panel may move in a z direction from a tool to the carrier chuck or from the carrier chuck to the tool.

In another aspect, the base plate of the carrier chuck may be sized to support the panel which may include multiple dies.

To more readily understand and put into practical effect the present carrier chuck, which may be used for panel handling, particular aspects will now be described by way of examples provided in the drawings that are not intended as limitations. The advantages and features of the aspects herein disclosed will be apparent through reference to the following descriptions relating to the accompanying drawings. Furthermore, it is to be understood that the features of the various aspects described herein are not mutually exclusive and can exist in various combinations and permutations. For the sake of brevity, duplicate descriptions of features and properties may be omitted.

FIG. 1 shows a simplified cross-section view of an exemplary carrier chuck 100 according to an aspect of the present disclosure. The carrier chuck 100 may include a base plate 110 with a top surface 115. A plurality of first magnet 120 may be positioned in a first region 130 of the top surface 115. The plurality of first magnet 120 may be configured to a first electromagnetic field to retain or suspend a panel placed on the carrier chuck 100 during panel processing.

In an embodiment, the first region 130 may correspond to at least a part of keep out zones on the panel. For example, the plurality of first magnet 120 (or overlap) only a part of the keep out zones. In other embodiments, the plurality of first magnet 120 may fully cover or overlap the keep out zones. Accordingly, an electromagnetic force may be applied from certain locations of the carrier chuck 100 on the panel. According to various aspects, the carrier chuck 100 may be used to produce an electromagnetic force only on the keep out zones on the panel. In other words, the at least one first magnet 120 of the carrier chuck 100 may be positioned on the base plate 110 to contact the panel from the designated keep out zones of the panel.

In an embodiment, the carrier chuck 100 may include a plurality of second magnets 150. The plurality of second magnet 150 may be positioned in a second region 140 of the top surface 115 of the chuck carrier 100. The plurality of second magnet 150 may be configured to produce a second electromagnetic field to retain or suspend the panel placed on the carrier chuck 100 during panel processing. The second region 140 may correspond to a second zone on a center of the panel. The second zone may be a keep out zone of the panel.

In an embodiment, the base plate 100 may further include a third region 160 of the top surface 115 for accommodating one or more device features of the panel such as solder bumps of the panel. The third region 160 may include areas or portions of the base plate 110 that do not have a magnet.

In an embodiment, the carrier chuck 100 may include slots on each of two edges to hold the panel.

In an embodiment, the carrier chuck 100 may include a center bar to physically hold the center of the panel. The carrier chuck 100 may include magnets on the edge (e.g., first region) of the base plate 110 to maintain a magnetic field with a strong gradient in the vertical direction (z direction). The magnetic field may act on the magnets on the panel, lifting sections of the panel to counteract the sag of gravity.

In an embodiment, the carrier chuck 100 may include an entire magazine-sized magnetic field generator, to support multiple panels.

In an embodiment, the carrier chuck 100 may include the magnets in the center of the base plate 110. The center KOZ of the panel may also have a number of magnetic vias, so that there is no need for a center bar to hold the panel.

In an embodiment, the edge KOZ of the panel may also have a number of magnetic vias, so that the panel is not contacted on top or bottom by the carrier chuck 100 during any part of processing.

In an embodiment, an epoxy with embedded magnetic material may be spread on a larger area of the panel, rather than embedding vias in the panel. This may result in a thinner panel which may have the advantage of shrinking the KOZs, leading to less wasted space.

In an embodiment, the keep out zones may have a variety of shapes, including circles, rectangles, squares, or any other shapes, depending on where features are placed or positioned and/or how much space is available for the keep out zones. Accordingly, magnets may be positioned on the base plate of the carrier chuck to correspond to the keep out zones so as to be compatible with other panel designs.

In an embodiment, this device disclosed herein may be used both for holding panels between operations and as a chuck within the magazine or within the tool.

In an embodiment, the magnetic field may be varied in time to slowly raise or to lower a panel from the tool to a holder, or vice versa. In an embodiment, the magnetic force may be applied equally to the entire panel (through evenly placed vias). The magnetic force may counteract the sag of gravity leading to less stress on the panel.

In an embodiment, the magnetic fields on the transfer mechanism may be non-uniform, to account for non-uniform via placement and further minimize stress.

In an embodiment, the magnetic field can be reversed to chuck (attractively) the panels to a panel holder using an attractive force near the magnets embedded in the center and edge KOZs. By turning the magnetic field on or off, the panels may be chucked or dechucked.

In an embodiment, while the panels are attached to the carrier chuck, handling may be easier as the carrier chuck provides necessary stability.

In an embodiment, by varying the magnetic field, the sag of the panel may also be modified. This can be used to correct for across-panel variations in processes (e.g., thicker films or faster etches near the edge).

Figure 2A:
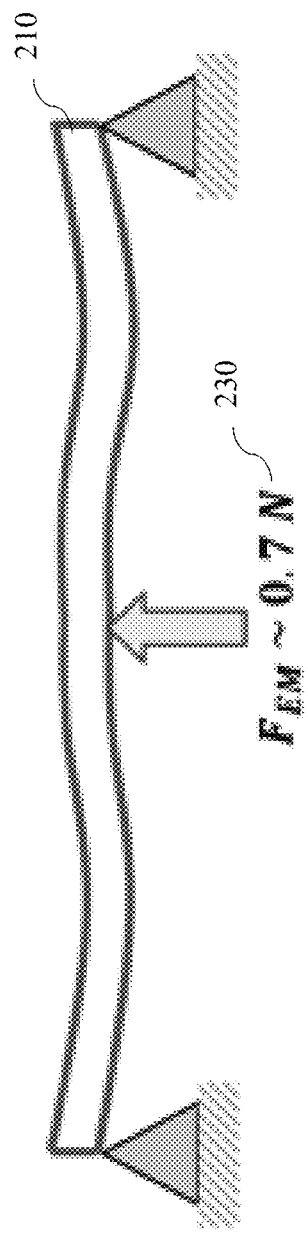
FIGS. 2A and 2B show exemplary thin panels under electromagnetic fields according to an aspect of the present disclosure.
Figure 2B:
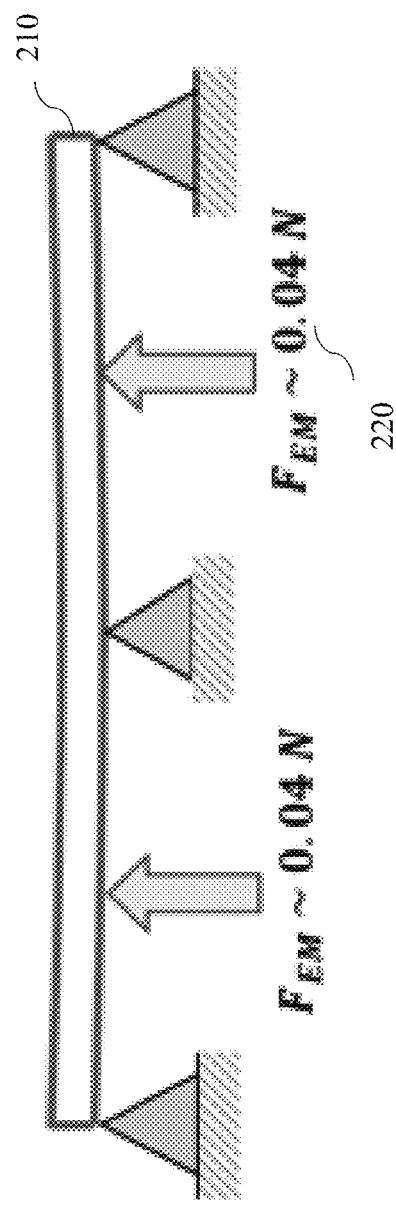

FIGS. 2A and 2B show exemplary thin panels under electromagnetic fields according to an aspect of the present disclosure.

In an embodiment, the thickness of a thin panel (e.g., a glass substrate) may be 200 um. The thin glass panel may have a dimension of 510*515 mm. Other form factors may also apply.

In an embodiment, each quarter panel of the thin panel may be divided into a predetermined number of units, for example 4 units. Other form factors may apply, the more units, the stronger the electromagnetic effect that described below. In an embodiment, a predetermined number of vias, e.g., 4 vias may be drilled in unused parts (e.g., keep out zones) of the thin panel e.g., in the center of each quarter panel where the units meet and filled with a magnetic material. Each via may have a diameter of 5 mm diameter. If there are more units per quarter panel, more vias can be inserted. To achieve the most uniform force, it may be necessary to embed some of the vias outside the KOZs, whether that be in the corner of units or other unused areas within the cores of units. This may aid with detectability, however, an advantage can be gained even while limiting the magnetic regions to the KOZs.

In an embodiment, the magnetic material may be iron, a resin with embedded magnetic material, or a rare-earth magnet. The magnetic material may be magnetized. Vias may be inserted in KOZs, in between units, or in any area within a unit where they will not disturb necessary routing.

In an embodiment, the magnetic material inside the vias may be a rare-earth magnet. A rare-earth magnet may have a remanence of ~1 T, and thus a magnetization of $$800 \frac{kN \cdot m}{T * m^{\wedge}3}.$$

The magnetic moment of a magnet-filled via is thus $$m = 3 \frac{mN \cdot m}{T}.$$

The force, given a magnetic moment, is F=m·∇B=60 mN, using an achievable 20 T/m magnetic field gradient. The mass of the panel, on the other hand, is 131 g, for a total weight of 1.2 N. The magnets together may be support a sizable fraction (e.g., 20%) of the panel, which is sufficient to reduce sagging. In an embodiment, if a commercially-available resin with embedded magnetic particles is used instead of a rare-earth magnet, the remanence and thus force are about 40% of what is described.

In an embodiment, for a panel 210, a center support 230 of 0.7 N (e.g., 12 rare-earth vias) and quarter-panel supports 220 of 0.04 N (divided between the two magnetic vias) may be sufficient to eliminate all sag.

TABLE 1

| Purpose | Force Needed (for 200 um core) | 5 mm diameter, 200 um thick vias needed | 1 mm diameter, 200 um thick vias needed |
| --- | --- | --- | --- |
| Remove sag between center KOZ and end KOZ | 0.08N | 2 vias | 36 vias |
| Replace center support for no sag | 0.7N | 12 vias (2.7% of KOZ) | 300 vias (~5 mm spacing) |
| Suspend panel entirely | 1.2N | 20 vias (0.15% of total area) | 500 vias (~20 mm spacing) |

Table 1 shows the magnetic force and vias needed for various purposes.

In an embodiment, to remove sag between center KOZ and end KOZ of the panel, a magnetic force of 0.08 N may be required for a 200 um core. This may be in the form of 2 vias of 5 mm diameter or 36 vias of 1 mm diameter.

In an embodiment, to replace center support (e.g., the bar for physical support) for no sag, a magnetic force of 0.7 N may be required for a 200 um core. This may be in the form of 12 vias of 5 mm diameter which may be 2.7% of the KOZ or 300 vias of 1 mm diameter with about 5 mm spacing.

In an embodiment, to suspend a panel entirely, a magnetic force of 1.2 N may be required for a 200 um core. This may be in the form of 20 vias of 5 mm diameter which may be 0.15% of the total area of the panel or 500 vias of 1 mm diameter with about 20 mm spacing.

Figure 3:
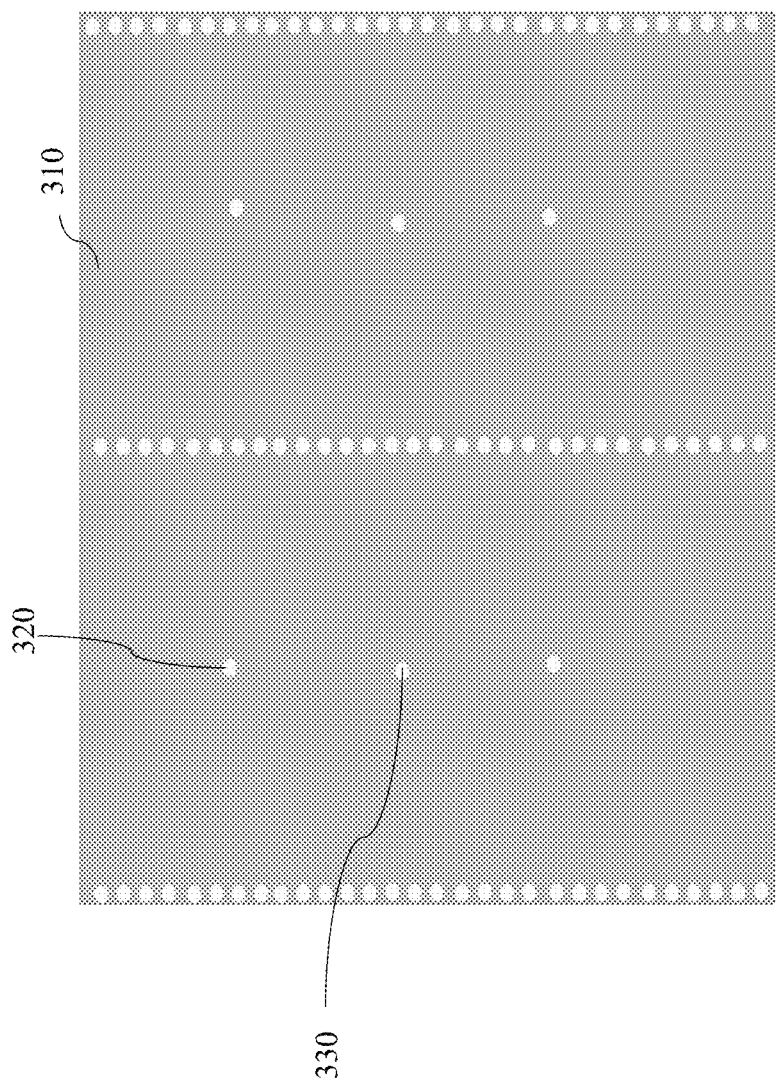
FIG. 3 shows a top view of an exemplary thin panel according to an aspect of the present disclosure.

FIG. 3 shows a top view of an exemplary thin panel according to an aspect of the present disclosure.

As shown in FIG. 3, for a panel 310, there may be a center support 330 and quarter-panel supports 320. The center support 330 and quarter-panel supports 320 may be vias filled with magnetic material. The panel 310 may have a length $l_p$ of about 500 mm and a width $w_p$ of about 505 mm (e.g., dimension of about 500 mm×505 mm). It is understood that other dimensions of the panel may also be used.

FIG. 4A to 4D shows an exemplary method according to an aspect of the present disclosure.

As shown in FIG. 4A, a robot arm may bring a thin panel 410 to a carrier chuck 400. The thin panel 410 may include edge vias 420 filled with magnetic material and center vias 430 filled with magnetic material. The carrier chuck 400 may produce an electromagnetic force to attract the vias on the thin panel 410 in a z direction.

As shown in FIG. 4B, the carrier chuck 400 may have vertical guides 440 to prevent the thin panel 410 from moving in a x-y direction.

As shown in FIG. 4C, the robot arms retract while the vertical guides 440 to prevent the thin panel 410 from moving in a x-y direction. The electromagnetic force may vary of time, e.g., gradually decrease to lower the thin panel 410 to the carrier chuck 400.

As shown in FIG. 4D, the electromagnetic force approaches 0 as the thin panel 410 approaches the carrier chuck 400. The polarity of the electromagnetic force is reversed to pull the panel 410 to the surface of the carrier chuck 400. The vertical guides 440 retract and the panel is ready for panel processing.

Figure 5:
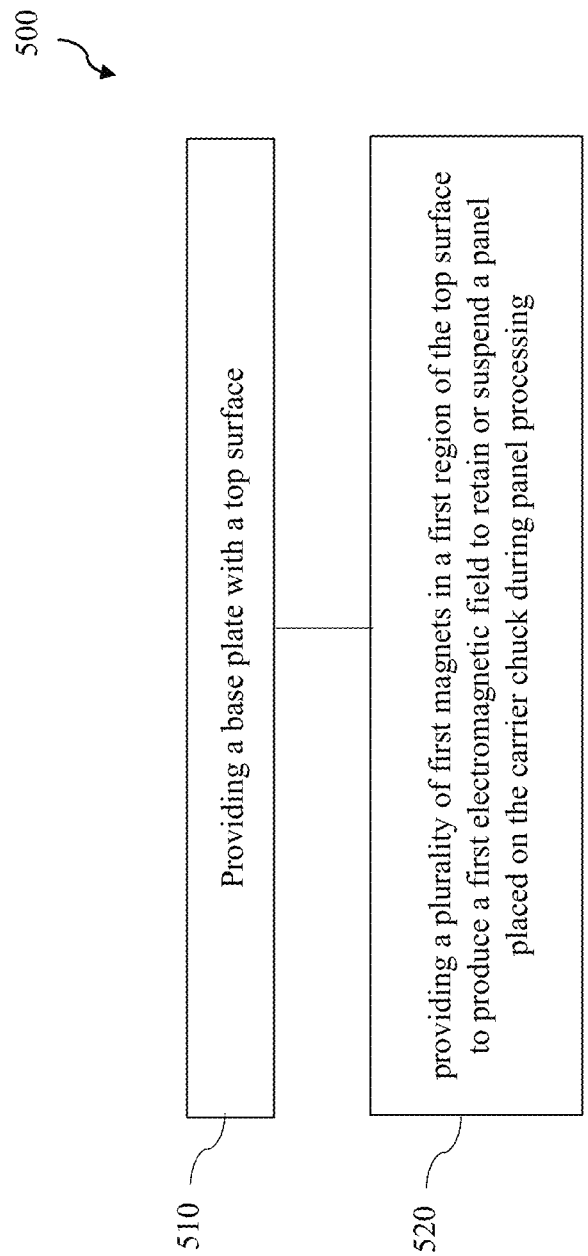
FIG. 5 shows another exemplary method according to an aspect of the present disclosure.

FIG. 5 shows an exemplary method 500 according to an aspect of the present disclosure. For example, the method 500 may be used for forming a carrier chuck according to various aspects. At 510, a base plate with a top surface may be provided. At 520, providing a plurality of first magnet in a first region of the top surface to produce a first electromagnetic field to retain or suspend a panel placed on the carrier chuck during panel processing. The first region corresponds to a region of the panel which comprises a magnetic material.

It will be understood that any property described herein for a specific tool may also hold for any tool or system described herein. It will also be understood that any property described herein for a specific method may hold for any of the methods described herein. Furthermore, it will be understood that for any tool, system, or method described herein, not necessarily all the components or operations described will be enclosed in the tool, system, or method, but only some (but not all) components or operations may be enclosed.

To more readily understand and put into practical effect the present carrier chuck configured to magnetically hold or bond a panel with an electromagnetic force, will now be described by way of examples. For the sake of brevity, duplicate descriptions of features and properties may be omitted.

EXAMPLES

Example 1 provides a carrier chuck including a base plate with a top surface, a plurality of first magnets positioned in a first region of the top surface, the plurality of first magnets configured to produce a first electromagnetic field to retain or suspend a panel placed on the carrier chuck during panel processing. The first region corresponds to a region of the panel which comprises a magnetic material.

Example 2 may include the carrier chuck of example 1 and/or any other example disclosed herein, for which the plurality of first magnets correspond to a first zone on a periphery of the panel.

Example 3 may include the carrier chuck of example 2 and/or any other example disclosed herein, for which the carrier chuck further includes a plurality of second magnets positioned in a second region of the top surface, the plurality of second magnets configured to produce a second electromagnetic field to retain or suspend the panel placed on the carrier chuck during panel processing. The second region corresponds to a second zone on a center of the panel.

Example 4 may include the carrier chuck of example 1 and/or any other example disclosed herein, for which the carrier chuck further includes a bar positioned in a second region of the top surface, the bar configured to physically retain the panel placed on the carrier chuck during panel processing. The second region corresponds to a second zone on a center of the panel.

Example 5 may include the carrier chuck of example 3 and/or any other example disclosed herein, for which the first electromagnetic field is different from the second electromagnetic field.

Example 6 may include the carrier chuck of example 5 and/or any other example disclosed herein, for which the first electromagnetic field and the second electromagnetic field are varied over time.

Example 7 may include the carrier chuck of example 5 and/or any other example disclosed herein, for which the first electromagnetic field is configured to suspend the first zone of panel at a first height and the second electromagnetic field is configured to suspend the second zone of the panel at a second height, wherein the first height and the second height are substantially the same height.

Example 8 may include the carrier chuck of example 1 and/or any other example disclosed herein, including one or more vertical guides, wherein the one or more vertical guides are configured to prevent the panel from moving in a x-y direction during panel processing.

Example 9 provides a method including providing a base plate with a top surface, providing a plurality of first magnets in a first region of the top surface to produce a first electromagnetic field to retain a panel placed on the carrier chuck during panel processing. The first region corresponds to a region of the panel which comprises a magnetic material.

Example 10 may include the method of example 9 and/or any other example disclosed herein, in which the plurality of first magnets correspond to a first zone on a periphery of the panel.

Example 11 may include the method of example 9 and/or any other example disclosed herein, including providing a plurality of second magnets in a second region of the top surface to produce a second electromagnetic field to retain or suspend the panel placed on the carrier chuck during panel processing, wherein the second region corresponds to a second zone on a center of the panel.

Example 12 may include the method of example 9 and/or any other example disclosed herein, including forming a bar in a second region of the top surface to physically retain the panel placed on the carrier chuck during panel processing, wherein the second region corresponds to a second keep out zone on a center of the panel.

Example 13 may include the method of example 9 and/or any other example disclosed herein, in which the first electromagnetic field is different from the second electromagnetic field.

Example 14 may include the method of example 12 and/or any other example disclosed herein, including using the first electromagnetic field to suspend the first zone of panel at a first height; and using the second electromagnetic field is configured to suspend the second zone of the panel at a second height, wherein the first height and the second height are substantially the same height.

Example 15 may include the method of example 9 and/or any other example disclosed herein, including providing one or more vertical guides, wherein the one or more vertical guides are configured to prevent the panel from moving in a x-y direction during panel processing.

Example 16 provides a method including providing a panel, providing a carrier chuck, the carrier chuck including a base plate with a top surface, a plurality of first magnets positioned in a first region of the top surface, the plurality of first magnets configured to produce a first electromagnetic field to retain or suspend a panel placed on the carrier chuck during panel processing, wherein the first region corresponds to a region of the panel which comprises a magnetic material, positioning the panel over the carrier chuck to align at least a part of the region of the panel which comprises the magnetic material to the plurality of first magnets in the first region of the top surface, magnetically bonding the panel to the carrier chuck by an electromagnetic force to produce a magnetically bonded panel, and processing the magnetically bonded panel in one or more tools.

Example 17 may include the method of example 16 and/or any other example disclosed herein, including providing a plurality of second magnets in a second region of the top surface to produce a second electromagnetic field to retain or suspend the panel placed on the carrier chuck during panel processing, wherein the second region corresponds to a second zone on a center of the panel.

Example 18 may include the method of example 16 and/or any other example disclosed herein, including forming a bar in a second region of the top surface to physically retain the panel placed on the carrier chuck during panel processing, wherein the second region corresponds to a second zone on a center of the panel.

Example 19 may include the method of example 17 and/or any other example disclosed herein, for which the first electromagnetic field is different from the second electromagnetic field.

Example 20 may include the method of example 17 and/or any other example disclosed herein, including using the first electromagnetic field to suspend the first zone of panel at a first height; and using the second electromagnetic field is configured to suspend the second zone of the panel at a second height, wherein the first height and the second height are substantially the same height.

The term "comprising" shall be understood to have a broad meaning similar to the term "including" and will be understood to imply the inclusion of a stated integer or operation or group of integers or operations but not the exclusion of any other integer or operation or group of integers or operations. This definition also applies to variations on the term "comprising" such as "comprise" and "comprises".

While the present disclosure has been particularly shown and described with reference to specific aspects, it should be understood by those skilled in the art that various changes in form and detail may be made therein without departing from the spirit and scope of the present disclosure as defined by the appended claims. The scope of the present disclosure is thus indicated by the appended claims and all changes which come within the meaning and range of equivalency of the claims are therefore intended to be embraced.

What is claimed is:

1. A carrier chuck comprising:
   a base plate with a top surface;
   a plurality of first magnets positioned in a first region of the top surface, the plurality of first magnets configured to produce a first electromagnetic field to retain or suspend a panel placed on the carrier chuck during panel processing, wherein the plurality of first magnets correspond to a first zone on a periphery of the panel; and
   a plurality of second magnets positioned in a second region of the top surface, the plurality of second magnets configured to produce a second electromagnetic field to retain or suspend the panel placed on the carrier chuck during panel processing, wherein the second region corresponds to a second zone on a center of the panel; and
   wherein the first and second regions correspond to regions of the panel which comprise a magnetic material; and
   wherein the first electromagnetic field is different from the second electromagnetic field; and
   wherein the first electromagnetic field is configured to suspend the first zone of the panel at a first height and the second electromagnetic field is configured to suspend the second zone of the panel at a second height, wherein the first height and the second height are substantially the same height.

2. The carrier chuck of claim 1, comprising:
   a bar positioned in a second region of the top surface, the bar configured to physically retain the panel placed on the carrier chuck during panel processing;
   wherein the second region corresponds to a second zone on a center of the panel.

3. The carrier chuck of claim 1, wherein the first electromagnetic field and the second electromagnetic field are varied over time.

4. The carrier chuck of claim 1, comprising:
   one or more vertical guides, wherein the one or more vertical guides are configured to prevent the panel from moving in a x-y direction during panel processing.

* * * * *